United States Patent
Constantin et al.

(10) Patent No.: US 7,509,341 B2
(45) Date of Patent: Mar. 24, 2009

(54) STATELESS-OBJECT SOFTWARE ENVIRONMENT

(75) Inventors: Michael Constantin, Irvine, CA (US); David J. Lovat, Huntington Beach, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 392 days.

(21) Appl. No.: 11/346,877

(22) Filed: Feb. 3, 2006

(65) Prior Publication Data

US 2007/0198576 A1 Aug. 23, 2007

(51) Int. Cl.
*G06F 17/30* (2006.01)

(52) U.S. Cl. .................................. 707/103 R

(58) Field of Classification Search .................. None
See application file for complete search history.

(56) References Cited

U.S. PATENT DOCUMENTS

| | | | | |
|---|---|---|---|---|
| 5,440,735 | A * | 8/1995 | Goldring | 707/8 |
| 6,134,559 | A | 10/2000 | Brumme et al. | 707/103 R |
| 6,182,198 | B1 * | 1/2001 | Hubis et al. | 711/162 |
| 6,473,769 | B1 * | 10/2002 | Andrew et al. | 707/103 R |
| 6,769,124 | B1 * | 7/2004 | Schoening et al. | 719/316 |
| 7,353,521 | B1 * | 4/2008 | Jin | 719/330 |
| 2002/0059134 | A1 * | 5/2002 | Ebbs et al. | 705/37 |
| 2002/0073236 | A1 * | 6/2002 | Helgeson et al. | 709/246 |
| 2003/0014556 | A1 * | 1/2003 | Conway | 709/316 |
| 2004/0177093 | A1 | 9/2004 | Mullens | 707/104.1 |
| 2005/0027559 | A1 * | 2/2005 | Rajan et al. | 705/1 |

OTHER PUBLICATIONS

Daly et al., Building Your First Stateless Session Bean, Feb. 1999, Sun Microsystems, http://java.sun.com/developer/onlineTraining/Beans/EJBTutorial/.*

* cited by examiner

*Primary Examiner*—Yicun Wu
(74) *Attorney, Agent, or Firm*—Law Office of Gerald Maliszewski; Gerald Maliszewski

(57) ABSTRACT

A stateless-object method is provided for executing instructions. The method: establishes a central repository of states, cross-referencing state locations in memory, to identifiers; calls a first method; accesses a stateless-object in response to the first method, the stateless-object including an identifier and a second method; reads the identifier; uses the identifier to cross-reference the stateless-object's state location in the repository; accesses the located state; and, instantiates the second method in response to accessing the state. The central repository of states may cross-reference a first state to a first identifier, and the step of accessing the stateless-object includes accessing a plurality of stateless-objects in response to the first method, with each of the stateless-objects including the first identifier. Then, the step of locating the state of the stateless-object using the identifier includes locating the first state for each of the plurality of stateless-objects by using the first identifier.

15 Claims, 3 Drawing Sheets

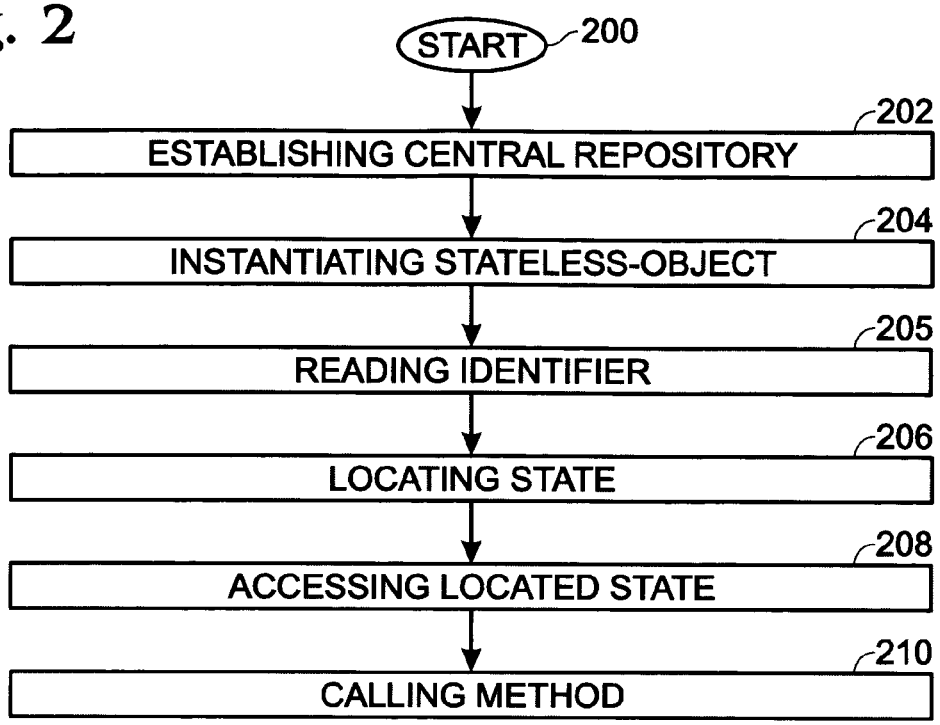
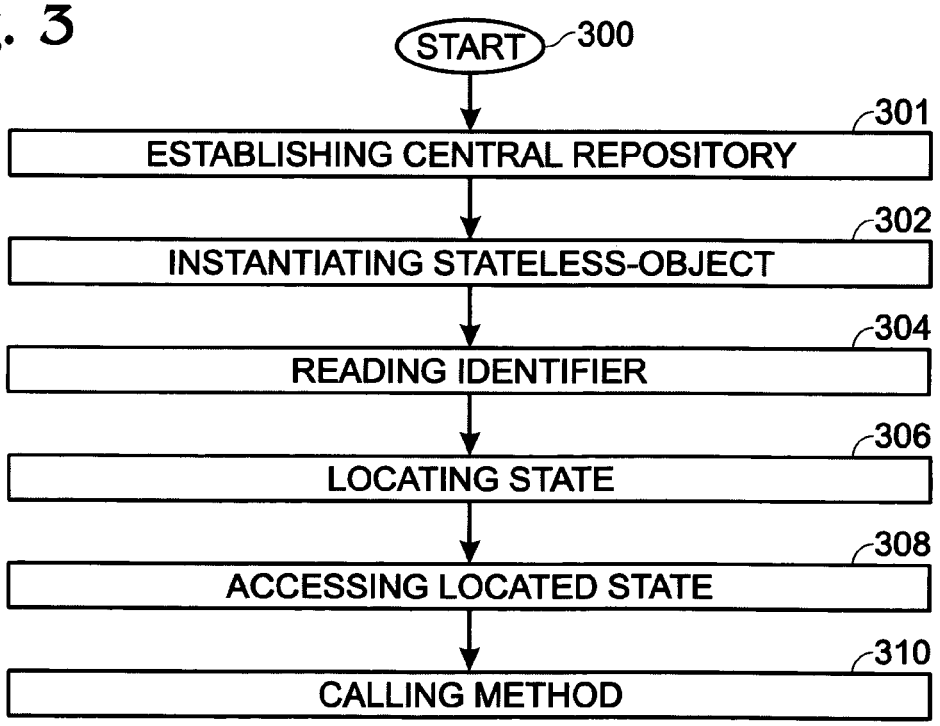

STATELESS-OBJECT SOFTWARE ENVIRONMENT

BACKGROUND OF THE INVENTION

1. Field of the Invention

This invention generally relates to object-oriented software environment and, more particularly, to a stateless-object method for executing programmable instructions.

2. Description of the Related Art

As noted in U.S. Pat. No. 6,134,559, Brumme et al., an object-oriented approach to programming provides advantages over conventional procedural programming approaches. For example, an object-oriented approach permits code reuse through inheritance, and modularity through encapsulation. There are many views as to what concepts define object oriented programming, and there are many terms and definitions for defining these concepts. In general, objects incorporate procedures, also called methods or operations, and data, also called attributes or properties. Objects are instantiated from, and described by structures known as classes or types. A class is a general abstract specification, and an object instantiated from a class is a specific concrete instance of the class.

A class consists of an interface and an implementation. The interface comprises variables and function declarations, wherein the variables represent the attributes of the type, and the function declarations specify methods for manipulating those attributes as well as performing other operations. The declaration specifies the name, return type, and argument, known collectively as the signature. The implementation refers to the actual code that implements the methods specified in the interface.

Object-oriented languages, such as the C++ language, permit the creation of special classes via inheritance. In general, inheritance is a mechanism for passing attributes and methods from a parent or base class to one or more child or derived classes. Inheritance permits code reuse because interfaces and implementations need not be duplicated in the child class. Instead, the interfaces and implementations may be incorporated in any child class through reference of the parent or base class.

In general, objects communicate through message passing mechanisms. An object, known as a client object, may call a method of another object. A client object invokes a method of another object by accessing the object via the defined interfaces. Thus, to invoke a method in an object or to query an object, the client object requires knowledge of the signatures of the methods in the interface of the target object. The client object calls the methods and passes the appropriate parameters. For example, to obtain the value of an attribute in an object, a client object calls a method, via an interface, to obtain the value.

As noted in US Publication 2004/0177093, Mullins, a frequent approach for accessing data stores involves writing and embedding custom access code within an object application needing the access. This approach is generally limited to having the custom code access only a single relational table within a relational database or similar construct within any other data store. Under the circumstances where a developer has control over the design and creation of a data store from its inception, it is possible to design and store meaningful information in a single table. Such design opportunities are usually rare, however.

Generally, the methods for producing persistence for a data object, complex data object, or a data store conflict with the goals of producing pure object application models where the object models do not include persistence objects or persistence byte code. Particular difficulties exist in a distributed environment since an object application model may exist in one or more of a computer's memory, an application data store and an application information storage repository that may be independent of the data store organization or object definitions.

Persistence problems arise with the creation, access, changing, or deleting of an object application model that utilizes data stores. The object application model may be distributed over multiple physical computer machine locations or even distributed over multiple Internet website locations that may be independent of the data stores. The object application model may utilize a different set of data objects or different set of definitions for relationships between data objects than that of one or more of its data sources. In most situations, the respective structures of the data sources and of the object applications model simply do not conveniently allow for mapping, accessing, or changing of an overall schema of application data objects as well as any associated definitions of relationships between two or more data objects or elements within a data object.

Relationships may exist between a data object and one or more of the other data objects found in the object application model or in a data object of the data source. A relationship between one data object and another data object or with a data source may be member selected from the group of three relationship types consisting of 1 to 1 (1-1), 1 to many (1-M) or many to many (M-M). Complex combinations of these relationships may exist as a data object relationships definition for a given data object.

Objects may logically span multiple relational tables or multiple object databases, and may even be distributed over a logical computer system involving multiple physically independent computer systems or even multiple website locations. Creating, accessing, maintaining or updating an object application model can require working with multiple translation modules and require tedious and repetitive updating of multiple individual computer systems or multiple data sources in order to do useful work and keep the object application model synchronized. Such approaches are both costly and unwieldy in terms of computing and development resources.

Data objects of an object application model are often a feature of an object programming applications, where information is obtained from a data source and the data is defined as a data object (e.g., as a JAVA class) for use with another computer application. In practice, a data object or model of data objects may exist only in the random access memory of a computer memory system, or may be saved to either a data source or to some other type of retrievable information repository. A programmer or administrator of an object data application cannot easily access or track the overall model or diagram of data objects for an object application model or some of its specific elements. Unfortunately, tools for accessing and persisting data objects and associated data object relationships of a complex data object graph model have not been well implemented in the field of object language programming.

A computer application can execute one or more of the following non-limiting actions with respect to one or more of the members selected from the group consisting of data, a data object, and a data object definition: access data, change data, create data, create a new relationship between one or more data objects by creating or changing at least one data object relationship definition, change or delete a relationship between one or more data objects by changing or deleting at least one data object relationship definition, access a data object relationship definition and use its parameters to access a data source or a data object, and access one or more data object relationship definitions or data objects to create a new data object or data object relationship. Any changes executed by a computer application with respect to one or more of the members selected from the group consisting of data, data object or data object definition may need to be properly persisted (permanently stored) to preserve any changes to one or more of the members selected from the group consisting of data, a data object and a data object definition.

"Instance" as referred to herein is a single occurrence of a software logical element in the memory of a computer system, such as a "class", an "object", a "data object", and the like. This is analogous to the occurrence of a logical memory unit representing a row of data in common practice. "Class" as referred to herein is a logic unit in a computer application or a computer software program where the application or program is based upon an objected oriented programming language (e.g., JAVA). In practice, a class is a logical unit used as a logical template in an object oriented language from which to allocate new instances of objects. "Object" as used herein is a general term referring to a logic unit in a computer application or a computer software program where the application or program is based upon an object-oriented programming language (e.g., JAVA). The term "object" may ordinarily be used interchangeably with the term "class" as a template or as an instance depending on the context. As used herein, "Data object" represents the concept of the occurrence of an object that holds data within a specific computer application domain and is likely to have its contents stored in a persistent data source of a computer system (e.g., a database server, a binary file, a text file, or even in a combination of two or more of such a persistent data sources of a computer system). A data object may exist as an independent data object without any relationship to any other data object or it may have one or more relationships with itself or with one or more other data objects. "Navigation", "navigating" or "navigated" refers to an action implementing at least one object to interact with a set of related objects for a certain purpose, such as creation, access, insertion, modification and deletion of an object, or of one of its relationships.

As noted above, many software systems are modeled using object-oriented methodologies, where objects represent real-world objects in the problem domain. These modeled objects possess methods and information about the object, referred to as "state". State data can be, for example, the object's name, its color, or its location. The actual state information is stored within the object itself Therefore, if the user of the system creates two objects, both representing the same physical object, it is possible to change the state of one object, while leaving the other object's state unchanged. This results in the problem of having an inconsistency between multiple modeled objects' state information. This is usually addressed by maintaining complex relationships between objects to ensure that the user gets a reference to the same existing object and, therefore, the same state. In systems where the lifetime of the objects depends on those external references, it becomes quite difficult to manage the lifetime correctly, to avoid circular references, to persist the system state, or to minimize the working set of the application.

System persistence becomes difficult because each object must save its state, but also, the complex relationships between objects must be persisted as well. This problem is usually addressed by giving each object unique identifiers, and persisting references to the same object as the object's identifier. But a framework must be in place to support this as transparently as possible to the user. This issue also applies to remote objects, because all the dependent objects must be remoted as well. Also, since the entire graph of objects is eventually instantiated during the system's lifetime, the working set in memory can become quite large.

It would be advantageous if programmable instructions could distinguish and manipulate an object's state, apart from the object itself

SUMMARY OF THE INVENTION

This present invention creates "stateless" objects, with the data representing their state being stored in a central data repository. Each object has a unique identifier that is used to locate its state in the common state repository. Multiple objects with the same identity can be created sharing the same state. Because the state is shared, any changes made through one object are reflected by all the other object instances. The object is called "stateless" because its state is both defined, and stored outside of the object itself (e.g., the central state data repository).

Because the objects are independent from one another, no object references need to be maintained. Objects are created by the user at will and discarded when not needed anymore. This greatly simplifies the lifetime management of the objects, and also reduces the working set, as only the common repository and the objects still referenced to by the user are needed in memory.

The system's state is simply saved by saving the state data repository. Additionally, it is possible to take and store a temporary snapshot of the system's state by copying the state data repository, thus allowing the system to be "rolled back" to a previous state (e.g., unlimited "undo" operations).

Is it still possible to share object references for a subset of the system's objects. For example, some objects may have a large state data, which is more difficult in terms of performance, to transfer to and from the central repository, or which is transient data. Similarly, some objects can support some kind of subscription mechanism to inform the user of particular changes in the state of the system. Those object instances can then be shared, for example, by registering in them in some central registration catalog. The present invention permits objects to be remoted easier, by remoting the central state repository, either by value or by reference.

Accordingly, a stateless-object method is provided for executing instructions. The method comprises: establishing a central repository of states, cross-referencing state locations in memory, to identifiers; calling a first method; instantiating a stateless-object in response to the first method, the stateless-object including an identifier and a second method; reading the identifier; using the identifier to cross-reference the stateless-object's state location in the repository; accessing the located state; and, calling the second method in response to accessing the state.

In one aspect, the central repository of states may cross-reference a first state to a first identifier, and the step of instantiating the stateless-object includes instantiating a plurality of stateless-objects in response to the first method, with each of the stateless-objects including the first identifier. Then, the step of locating the state of the stateless-object using the identifier includes locating the first state for each of the plurality of stateless-objects by using the first identifier.

In another aspect, the first method is called from a network-connected device discovery application. Then, the step of accessing the stateless-object includes accessing a stateless-less object associated with network-connected devices. For example, the stateless-object may be a serial number or model number.

Additional details of the above-described method are provided below.

BRIEF DESCRIPTION OF THE DRAWINGS

FIG. 2 is a flowchart illustrating a stateless-object method for executing printer discovery instructions.

FIG. 3 is a flowchart illustrating another expression of a stateless-object method for executing instructions.

DETAILED DESCRIPTION

Figure 1:
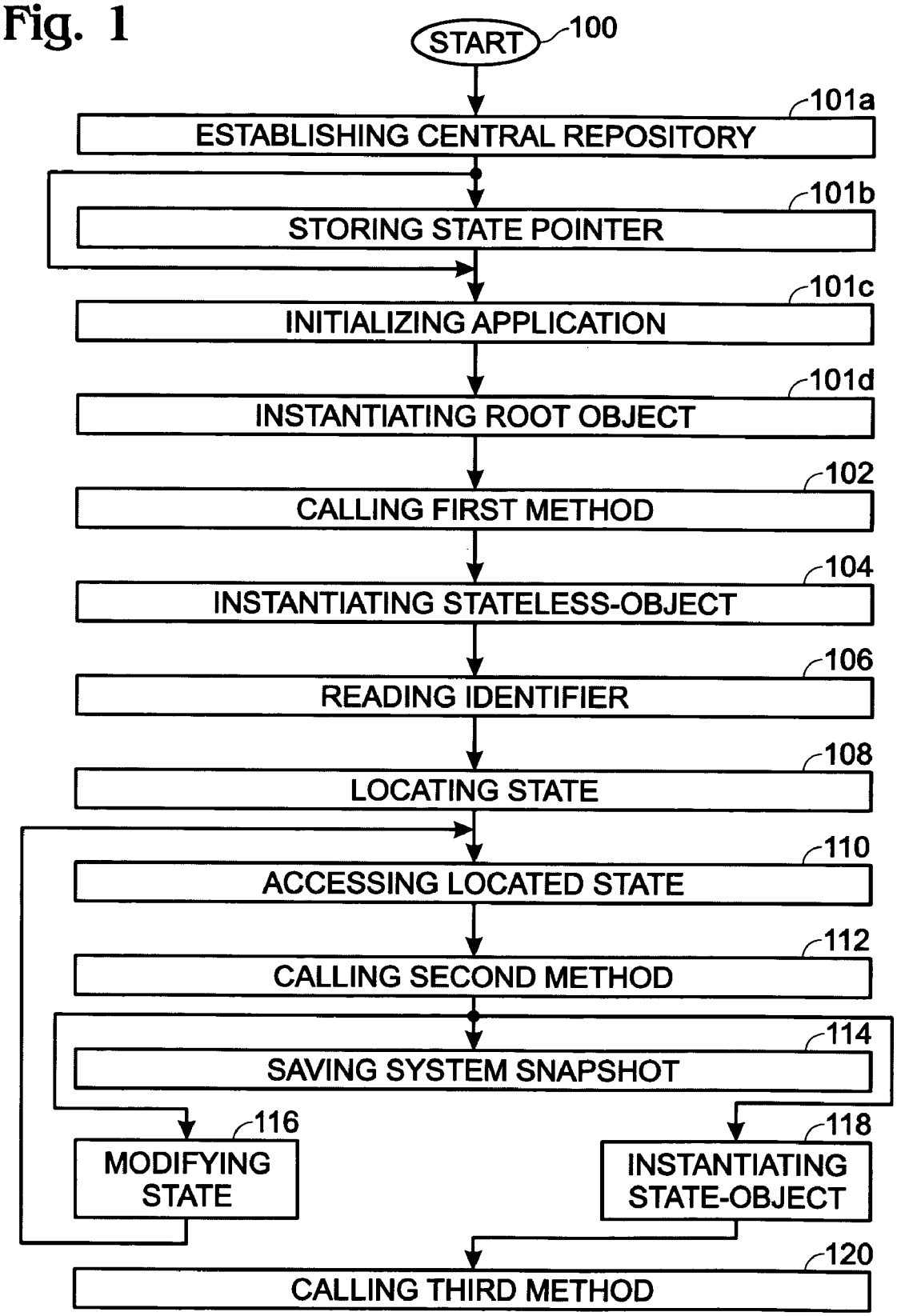
FIG. 1 is a flowchart illustrating a stateless-object method for executing instructions.

FIG. 1 is a flowchart illustrating a stateless-object method for executing instructions. The method is operated in the context of a signal bearing medium tangibly embodying a program of machine-readable instructions executable by a digital processing apparatus. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 100.

Step 102 calls a first method from an application. Step 104 instantiates (loads into memory) a stateless-object in response to the first method. The stateless-object includes an identifier and a second method. Step 106 reads the identifier. Step 108 locates a state of the stateless-object using the identifier. Step 110 accesses the located state. Step 112 calls the second method in response to accessing the state. The second method may, in turn, instantiate another object. Otherwise, if the stateless-object instantiated in Step 104 is final object, then the second method may execute some object-specific functionality.

In one aspect, Step 101a establishes a central repository of states. The repository cross-references state locations in memory to identifiers. Then, locating the state of the stateless-object in Step 108 includes using the identifier to cross-reference the stateless-object's state location in the repository.

For example, establishing the central repository of states in Step 101a includes cross-referencing a first state location to a first identifier, and a second state location to a second identifier. Instantiating the stateless-object in Step 104 includes instantiating a first stateless-object, in response to the first method, with the first identifier. Calling the second method in Step 112 includes instantiating a second stateless object including the second identifier.

In another aspect, establishing the central repository of states in Step 101a includes cross-referencing a first state to a first identifier. Instantiating the stateless-object in Step 104 includes instantiating a first plurality of stateless-objects in response to the first method, with each of the stateless-objects including the first identifier. That is, a plurality of stateless-objects is instantiated with the first identifier. Then, locating the state of the stateless-object using the identifier in Step 108 includes locating the first state for each of the first plurality of stateless-objects using the first identifier. That is, each of the stateless-objects with the first identifier has the same (first) state. In one aspect, Step 114 creates a "system snapshot" by saving the central repository of states in permanent memory. In this manner, all the objects and their respective states at any particular moment can be recovered in the event of a catastrophic system failure.

An object may have access, and be able to modify the state of another object. For example, Step 116 may modify a state, replacing the second method with an alternate method. Then, accessing the located state in Step 110 includes accessing the modified state, and calling the second method in response to accessing the state (Step 112) includes calling the alternate method in response to the state being modified. In some systems, this ability to modify states may result in an undesirable degree of cohesion between objects. Therefore in some aspects, instantiating the stateless-object in Step 104 includes instantiating a stateless-object devoid of mutable (changeable) states. Regardless of whether the state is mutable, the identifier is typically immutable. That is, Step 104 may instantiate a stateless-object with an immutable identifier.

In another aspect, Step 102 causes a network-connected device discovery application to call the first method. Then, instantiating the stateless-object in Step 104 includes instantiating a stateless-less object associated with network-connected devices. The stateless-object identifier may be device serial number, model number, version number, manufacturer, network card address (MAC address), or IP address. Then, accessing the located states of the network-connected device in Step 110 includes accessing states such as a network configuration parameter, DNS configuration, domain name system (DNS) name, DNS server address, and dynamic host configuration protocol (DHCP) protocol (e.g., lease duration, DHCP server address).

More explicitly, Step 102 may cause a network printer discovery application to call the first method. Then, accessing the located state in Step 110 includes accessing printer attributes such as paper size, paper orientation, resolution, color, on/off state, job status, or job priority, to name a few examples.

In another aspect, Step 101b permanently stores a state pointer. That is, an (initial) object may keep a reference (pointer) to another object. Instead of persisting the pointer, the reference object can be saved. Alternately, the reference object itself may be saved in permanent memory. Either way, the permanent location is called a key. Then, instantiating the stateless-object in Step 104 includes instantiating a stateless-object with a key directed to the state pointer. If Step 101b stores a plurality of state pointers, then, Step 104 may instantiate a stateless-object with a plurality of serialized keys directed to the plurality of state pointers in a particular order.

In a different aspect, Step 101c initializes the application. Step 101d instantiates a root object with information stored in permanent memory. Then, calling the first method from the application in Step 102 includes calling the first method from the root object, and establishing the central repository of states in Step 101a includes creating a linkage between stateless-object identifiers and states in permanent memory.

In some aspects it is desirable that instantiating a stateless-object in Step 104 includes instantiating a new stateless-object, including a first identifier and the second method, every time the first method is called.

The present invention can also incorporate elements of a conventional objected-oriented system, where objects contain their states and methods. That is, the method may instantiate either, or both stateless and conventional state-objects. In this aspect Step 118 instantiates a state-object including attributes and a third method, and Step 120 calls the third method.

FIG. 2 is a flowchart illustrating a stateless-object method for executing printer discovery instructions. Again, the method is understood in the context of a signal bearing medium tangibly embodying a program of machine-readable instructions executable by a digital processing apparatus. The method begins at Step 200. Step 202 establishes a central repository of states, cross-referencing a state location in memory, to an identifier. Step 204 instantiates a stateless-object, including the identifier and the method, from a network printer discovery application. Step 205 reads the identifier. Step 206 locates the state using the identifier. Step 208 accesses the located state. For example, Step 208 may access printer attributes such as paper size, paper orientation, resolution, color, on/off state, job status, or job priority. Step 210 calls the method in response to accessing the state.

FIG. 3 is a flowchart illustrating another expression of a stateless-object method for executing instructions. The method starts at Step 300. Step 302 instantiates a stateless-object including an identifier and a method. Step 304 reads the identifier. Step 306 locates a state of the stateless-object using the identifier. Step 308 accesses the located state. Step 310 calls the method in response to accessing the state.

In one aspect, Step 301 establishes a central repository of states, cross-referencing the state location in memory, to the identifier. Then, locating the state of the stateless-object in Step 306 includes using the identifier to cross-reference the stateless-object's state location in the repository.

Figure 4:
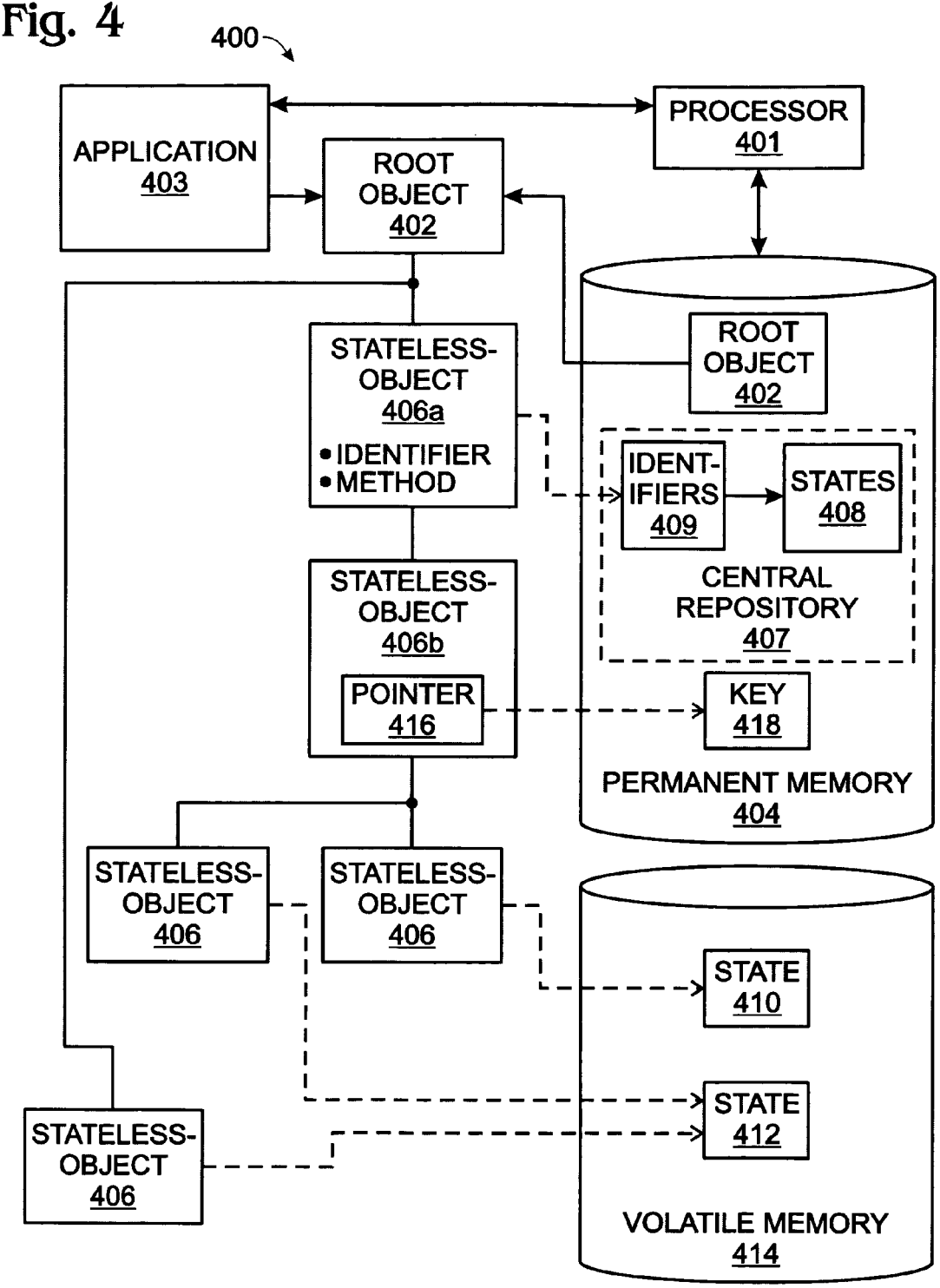
FIG. 4 is a drawing depicting a digital processing apparatus for executing stateless-object instructions.

FIG. 4 is a drawing depicting a digital processing apparatus for executing stateless-object instructions. The apparatus 400 comprises a processor 401 and a memory 404 accessible by the processor 401. An application 403 includes processor executable instructions stored in memory 404 for calling a first method (i.e., the method of stateless-object 406a), and instantiating a stateless-object 406 (i.e., 406b) in response to the first method. The stateless-object 406b includes an identifier and a second method (not shown). The application 403 reads the identifier, and locates a state of the stateless-object 406b using the identifier. Then, the application 403 accesses the located state and calls the second method in response to accessing the state.

In one aspect, the memory 404 includes a central repository of states 407, cross-referencing state locations in memory, to identifiers 409. Then, the application 403 locates the state of the stateless-object 406 by using the identifier 409 to cross-reference the stateless-object's state location in the repository 407.

FIG. 4 also shows a schematic diagram of stateless-objects in a tree structure. An application 403 calls a root, or factory object 402 upon initiation. The root object 402 is like a conventional state-object, as its state and any methods are contained and stored in permanent memory 404. However, the stateless-objects 406 instantiated as a result of the root object 402 typically include only an identifier and a method (not shown in every stateless-object). Some states (i.e., state 408) may be kept in permanent memory 404. Other states (i.e., states 410 and 412 are kept in volatile memory 414. Other states not shown, may be created instantaneously upon demand. A stateless-object may include a pointer 416 for accessing a key 418 in permanent memory 404.

Generally, each object has only one (private) data member, which represents a unique identifier for its state in the common repository. For example this could be an XPath expression if the common repository is an XML dataset, or a table name and unique id if the common repository is a relational database. Each object is instantiated using a special class factory object. The "create" method of the factory object takes this unique identifier and returns an instance of the object if its state exists and can be validated properly in the common repository.

The object has methods that return or modify its state. Access to state information is performed by accessing the central repository. An object may have access, and be able to modify the state of another object, which may result in cohesion between objects. Optimally, the system evolves based on well-defined protocols of internal interaction between objects.

Sometimes objects hold transient data (e.g. memory pointers, threads, etc.). Since objects are stateless, this information must also be persisted in the central repository in a form that can be serialized. For example, pointers can be stored in some application or system tables, and the corresponding keys are serialized as numbers, thread IDs, system objects handles.

Objects are organized in a hierarchy. The central repository is also organized logically in a hierarchical manner that reflects the object hierarchy. The root object of the hierarchy is the only object that is instantiated directly by the user, either as an "empty" object, or from a persistent storage. All other objects are returned by methods on their "parent" object. The parent object is usually the only one that is saved to or loaded from a persistent storage, at which time the entire system state as represented by the central repository is saved to or loaded from the persistent storage.

Some information in the system state (e.g., the transient state discussed above, or information obtained from physical devices on the network) is marked as non-persistent and it is not saved.

At load time, the root object instantiates some subordinate objects, which are marked as such, and giving them an opportunity to "rehydrate" any transient information, either by creating the necessary system objects, or querying the devices on the network. The lifetime of the objects is still controlled by references to the objects (i.e., objects are reference-counted).

One or more objects are hosted in one container (e.g., a dynamic-link library or a system process). The container stays in memory as long as there are external references (i.e., not references from other object(s) in the same container) to any of its objects. This mechanism also prevents the container from being held in memory because of unreleased internal references.

If the central repository does not support any form of scripting or eventing, some objects can contain additional metadata that indicate what action, if any, must be taken when certain state changes. The actions are implemented as methods on the objects themselves.

The objects implement one or more interfaces, specific to the problem domain. The object implementing the interfaces is marked with a unique identifier in the central repository. Therefore, the implementation can be substituted with a different object without affecting the rest of the system.

A stateless-object method is provided for executing instructions. Some examples of calling methods and instantiating objects have been given. Also provided are some applications in which the method might be used. However, the invention is not limited to merely these examples. Other variations and embodiments will occur to those skilled in the art.

We claim:

1. A computer readable medium having computer program code embodied therein, the computer program code adapted to be executed to implement instructions for using stateless-objects stored in memory to access memory locations representing states, the instructions comprising:

establishing a central repository of states, cross-referencing state locations in memory to identifiers, including a location in memory associated with a first state cross-referenced to a first identifier;

initiating an application;

from the application, calling a first method to access a location in memory representing a stateless-object;

instantiating the stateless-object in response to the first method, the memory location representing the stateless-object including an identifier and a second method, where a stateless-object is defined as an object having a defined state that is stored in a location in memory outside of the location in memory representing the object;

reading the identifier;

locating a memory location representing a state of the stateless-object using the identifier to cross-reference the memory location of the state in the repository;

accessing the memory location representing the state;

calling the second method in response to accessing the memory location representing the state;

wherein instantiating the stateless-object includes instantiating a first plurality of stateless-objects in response to the first method, with each memory location representing the stateless-objects including the first identifier; and, wherein locating the memory location representing the state of the stateless-object using the identifier includes locating the memory location representing the first state for each of the first plurality of stateless-objects using the first identifier.

2. The instructions of claim 1 wherein instantiating the stateless-object includes instantiating a stateless-object devoid of mutable states.

3. The instructions of claim 2 wherein instantiating the stateless-object includes instantiating a stateless-object with an immutable identifier.

4. The instructions of claim 1 wherein calling the first method from the application includes calling the first method from a network-connected device discovery application; and, wherein instantiating the stateless-object includes instantiating a stateless-less object associated with network-connected devices.

5. The instructions of claim 4 instantiating the stateless-object includes instantiating a stateless-object represented by a memory location including an identifier selected from the group including a serial number, model number, version number, manufacturer, network card address (MAC address), and IP address; and, wherein accessing the memory location representing the network-connected device state includes accessing a memory location representing states selected from the group including network configuration parameter, DNS configuration, DNS name, DNS server address, and DHCP protocol (lease duration, DHCP server address).

6. The instructions of claim 5 wherein calling the first method from the network-connected device discovery application includes calling the first method from a network printer discovery application; and, wherein accessing the memory location representing the state includes accessing a memory location representing printer attributes selected from the group including paper size, paper orientation, resolution, color, on/off state, job status, and job priority.

7. The instructions of claim 1 further comprising:

permanently storing a state pointer in a location in memory; and, wherein instantiating the stateless-object includes instantiating a stateless-object represented by a location in memory with a key directed to the state pointer.

8. The instructions of claim 7 wherein permanently storing the state pointer in the memory location includes storing a plurality of state pointers in a corresponding plurality of locations in memory; and, wherein instantiating the stateless-object includes instantiating a stateless-object represented by a location in memory with a plurality of serialized keys directed to the plurality of locations in memory representing the state pointers, in a particular order.

9. The instructions of claim 1 further comprising:

from the application, initially accessing a location in memory representing a root object;

instantiating the root object with information stored in permanent memory;

wherein calling the first method from the application, includes calling the first method from the root object; and, wherein establishing the central repository of states includes creating a linkage between stateless-object identifiers and locations in permanent memory representing states.

10. The instructions of claim 9 further comprising:

creating a system "snapshot" by saving the central repository of states in permanent memory.

11. The instructions of claim 1 further comprising:

modifying a location in memory representing a state, replacing the second method with an alternate method;

wherein accessing the location in memory representing the state includes accessing the modified state; and, calling the second method in response to accessing the location in memory representing the state includes calling the alternate method in response to the state being modified.

12. The instructions of claim 1 wherein establishing the central repository of states includes cross-referencing a first location in memory representing a first state to a first identifier, and a second location in memory representing a second state to a second identifier;

wherein instantiating the stateless-object includes instantiating a first stateless-object, in response to the first method, with the first identifier; and, wherein calling the second method includes instantiating a second stateless object including the second identifier.

13. A computer readable medium having computer program code embodied therein, the computer program code adapted to be executed to implement instructions for using stateless-objects stored in memory to access memory locations representing states, the instructions comprising;

establishing a central repository of states, cross-referencing state locations in memory to identifiers, and creating a linkage between stateless-object identifiers and states in permanent memory;

initializing an application;

accessing a location in memory representing a root object;

instantiating the root object with information stored in permanent memory;

from the application, calling a first method from the root object;

instantiating a stateless-object in response to the first method, the stateless-object represented by a location in memory including an identifier and a second method, where a stateless-object is defined as an object having a defined state with a location in memory that is stored outside of the location in memory representing the object;

reading the identifier;

locating a memory location representing a state of the stateless-object using the identifier to cross-reference the memory location of the state in the repository;

accessing the location in memory representing the state; and, calling the second method in response to accessing the location in memory representing the state.

14. The instructions of claim 13 further comprising:

creating a system "snapshot" by saving the central repository of states in permanent memory.

15. A computer readable medium having computer program code embodied therein, the computer program adapted to be executed to implement instructions for using stateless-objects stored in memory to access memory locations representing states, the instructions comprising:

establishing a central repository of states, cross-referencing state locations, in memory to identifiers, and in particular, cross-referencing a first location in memory representing a first state to a first identifier, and a second location in memory representing a second state to a second identifier;

initializing an application;

from the application, calling a first method to access a location in memory representing a first stateless-object;

instantiating the first stateless-object in response to the first method, the location in memory representing the first stateless-object including a first identifier and a second method, where a stateless-object is defined as an object having a defined state with a location in memory that is stored outside of the location, in memory, representing, the object;

reading the identifier;

locating a memory location representing a state of the stateless-object using the identifier to cross-reference the memory location of the state in the repository;

accessing the location in memory representing the state;

calling the second method in response to accessing the location in memory representing the state;

accessing a location, in memory representing a second stateless-object, the in memory location representing the second stateless-object including the second identifier; and, instantiating the second stateless-object.

* * * * *